Jan. 29, 1929.
H. BLUMENBERG, JR
1,700,347
PROCESS OF REFINING MINERAL OIL
Filed Jan. 12, 1927
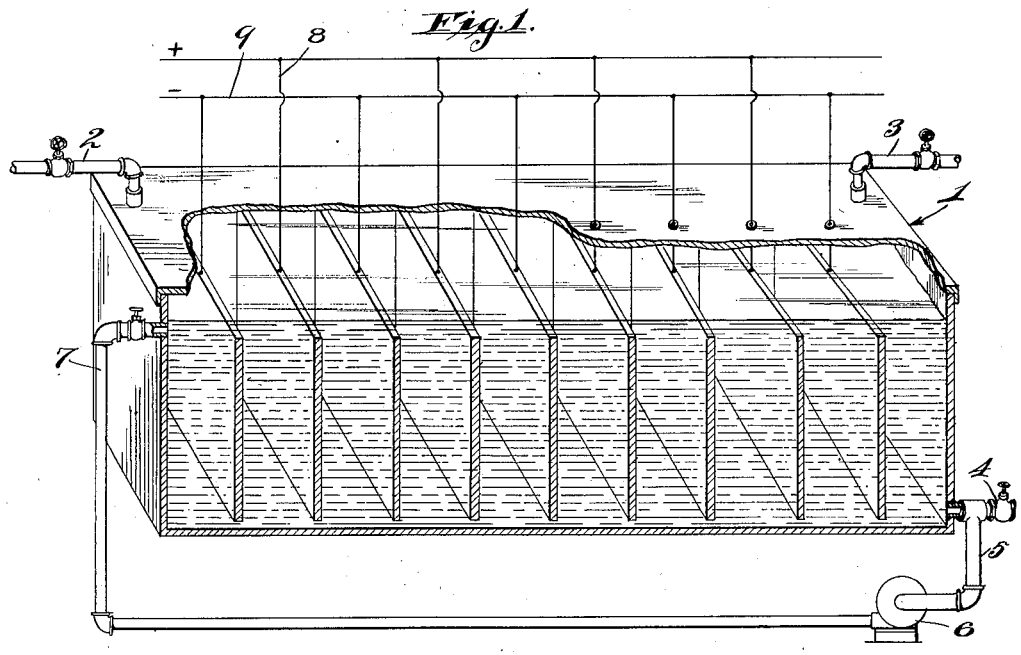
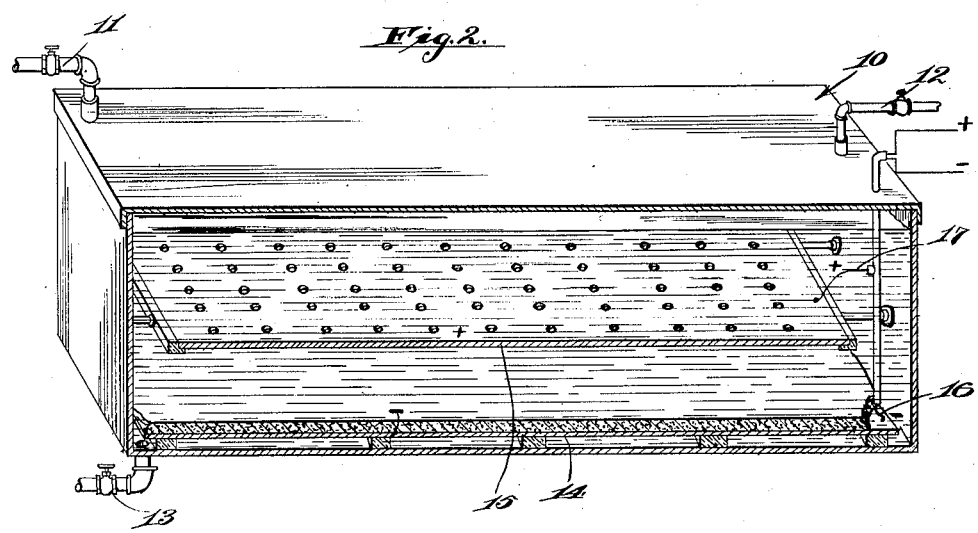
Inventor
H. Blumenberg, Jr.
by Hazard and Miller
Attorneys Patented Jan. 29, 1929.

1,700,347

UNITED STATES PATENT OFFICE.

HENRY BLUMENBERG, JR., OF LOS ANGELES, CALIFORNIA.

PROCESS OF REFINING MINERAL OIL.

Application filed January 12, 1927. Serial No. 160,761.

My invention relates to a process of refining mineral oil and is especially intended for the treatment of mineral oil and its products.

My invention comprises the generating in status nascendi of hydrogen and chlorine within the body of the liquid to be treated and for this purpose a chloride, such as hydrochloric acid, is electrolytically decomposed.

I preferably use for the anode, aluminum. The free chlorine generated at the anode will combine with the aluminum to form aluminum chloride at least in part. The liquid treated is preferably kept in circulation so as to insure a complete and rapid treatment thereof.

My invention consists of the steps of the process hereinafter described and claimed.

In the accompanying drawings, which form a part of the specification, I have shown diagrammatically an apparatus suitable for carrying out my process, and in which Figure 1 shows a vertical cross section of the apparatus for the treatment of mineral oil products, Fig. 2 is a similar view of a modified form.

Referring to the drawings, 1 indicates a closed tank, 2 being a valve controlled inlet pipe and 3 a valve controlled outlet pipe for the gases. 4 is a valve controlled outlet pipe for the liquid. 5 is a valve controlled circulation pipe in which 6 is a pump to circulate the liquid to the inlet 7 leading to the top of the tank 1. A series of electrodes, preferably in the shape of plates, are vertically arranged in spaced relation in tank 1, the anodes being made of aluminum, while for the cathodes any suitable material may be used such as nickel, steel or copper. Current is supplied by suitable conductors, 8 indicating the positive and 9 the negative, to which the respective electrodes are connected.

Hydrochloric acid from 2 to 7 per cent by weight of the liquid to be treated, the amount of the hydrochloric acid depending upon the purity of the gasoline to be treated, is added thereto.

Assuming that cracked gasoline is to be treated in the tank 1, the pump 6 is put in operation to circulate the gasoline and keep the same in agitation in the tank while a current, preferably of 3 to 7 volts and of the current strength of 10 amperes per square foot of the electrodes, is employed. Hydrogen will be generated at the cathodes and chlorine at the anodes. The chlorine will react upon the water and form hydrochloric acid and oxygen in part, while the remainder of the chlorine will combine with the aluminum to form aluminum chloride. The oxygen and hydrogen generated in the status nascendi will combine with the unsaturated hydrocarbon compounds at least in part.

The time of treatment varies to the quality of the gasoline, but usually one hour is sufficient.

The free gases rising to the top of the liquid are taken off through gas outlet pipe 3 and when the reaction is completed the gasoline is run off through the outlet pipe 4 to a still, not shown, where it is subjected to distillation. The aluminum chloride contained in the gasoline will act in the well known manner. An advantage of my process is that it avoids the handling of aluminum chloride by forming the same within the body of the liquid in its most active state.

In Fig. 2 I have shown a modified process and apparatus having a closed tank 10 in which a liquid inlet 11 and a gas outlet 12 and a liquid outlet 13 is provided. The anode 14 is placed near the bottom of the tank and is made of carbon. A layer of bauxite or any other aluminum compound, preferably in a state of fine division, is surrounding the anode 14. A cathode 15 is spaced horizontally above the anode 14, the anode being connected to a positive conductor 16 and the cathode to a negative conductor 17. The gasoline and the hydrochloric acid are then introduced in the tank 10 and the current is turned on. The same reaction will take place as described in connection with the apparatus shown in Figure 1, with the exception that the chlorine generated at the anode 14 will combine with the bauxite, forming aluminum chloride. After the reaction is completed, the liquid gasoline is run off to a still and subjected to distillation.

The above described process is especially efficient in the treatment of mineral oil products having a gravity of 38 to 40 Bé. and on the cracked product from high pressure stills.

The electrolytic decomposition can be carried out within the still itself, but owing to the explosive nature of the hydrogen and oxygen mixture that is formed it is not advisable to distill from the same apparatus that the electrolytic decomposition is carried out.

While ordinarily I contemplate the use of my process in connection with mineral oil products the crude oil itself may be treated with good results by my process described.

Various changes may be made in the steps of the process by those skilled in the art without departing from the spirit of my invention, as claimed.

I claim:

1. A process of treating mineral oil and its products with hydrochloric acid and decomposing said hydrochloric acid electrolytically in the presence of aluminum.

2. A process of treating mineral oil and its products comprising adding from 2 to 7 per cent by weight of hydrochloric acid to the mineral oil distillation product, disposing electrodes within the liquid, the anode being made of aluminum, passing an electric current through the liquid and said electrodes whereby aluminum chloride at least in part is formed at the anode and distilling the mixture.

3. A process of treating mineral oil and its products comprising adding from 2 to 7 per cent by weight of hydrochloric acid to the mineral oil distillation product, disposing electrodes within the liquid, the anode being made of aluminum, passing an electric current through the liquid and said electrodes whereby aluminum chloride at least in part is formed at the anode, agitating the distillation products during the electrolysis and distilling the mixture.

In testimony whereof I have signed my name to this specification.

HENRY BLUMENBERG, Jr.